United States Patent [19]
Meise

[11] Patent Number: 4,989,964
[45] Date of Patent: Feb. 5, 1991

[54] REAR-VIEW MIRROR

[76] Inventor: William H. Meise, P.O. Box 7138, Wrightstown Township, Bucks County, Pa. 18940

[21] Appl. No.: 362,520

[22] Filed: Jun. 7, 1989

[51] Int. Cl.$^5$ .............................................. G02B 7/18
[52] U.S. Cl. .................................. 350/616; 350/612; 350/631
[58] Field of Search ............... 350/320, 601, 612, 616, 350/626, 631, 641, 109, 162.23

[56] References Cited

U.S. PATENT DOCUMENTS

| | | | |
|---|---|---|---|
| 3,806,233 | 4/1974 | Stefano | 350/627 |
| 4,040,726 | 8/1977 | Paca | 350/601 |
| 4,040,727 | 8/1977 | Ketchpel | 350/601 |
| 4,127,771 | 11/1978 | Sick | 350/616 |
| 4,674,849 | 6/1987 | Stewart | 350/612 |
| 4,776,231 | 10/1988 | Cummins et al. | |
| 4,789,921 | 12/1988 | Aho . | |
| 4,801,193 | 1/1989 | Martin | 350/320 |
| 4,804,257 | 2/1989 | Schmidt et al. | |
| 4,850,682 | 7/1989 | Gerritsen . | |
| 4,886,341 | 12/1989 | Oishi et al. | 350/162.23 |
| 4,892,369 | 1/1990 | Moss . | |

OTHER PUBLICATIONS

Portion of Nov. 6, 1988, Advertisement in Philadelphia Inquirer Newspaper Illustrating "Wink", Segmented Mirror.
Page 113 of Mar. 1989, Issue of Popular Science Magazine Illustrating Frontal View of Nissan 300ZX Sports Car.
"Internal Side View", page 36 in the Apr. 1990, Issue of Popular Science Magazine.
Advertisement by Sundstrand, p. 123 in the periodical Aviation Week and Space Technology, May 29, 1989, Similar Advertisement on p. 125 same periodical.

*Primary Examiner*—Bruce Y. Arnold
*Assistant Examiner*—J. P. Ryan

[57] ABSTRACT

A conventional exterior rear-view mirror is broken into vertical segments and collapsed into a stack in a plane roughly orthogonal to its original plane, so the frontal area is drastically reduced, thereby reducing drag and increasing fuel mileage. The total projected width of the vehicle is also reduced. In one embodiment of the invention, the exterior rear-view mirror is formed as part of a side window, thereby completely eliminating projections to achieve advanced streamlining, and also potentially decreasing manufacturing costs. In another embodiment, a rear view is provided from a sun roof. When formed as part of the canopy of an aircraft, a rear view is provided without significant weight or complexity. Another embodiment of the invention lies in a sheet of flexible adhesive-backed plastic which may be affixed to a window. In the context of a truck, the exterior rear-view mirror does not project significantly beyond the innermost edge of an equivalent conventional rear-view mirror, thereby reducing both drag and excess lateral dimension.

34 Claims, 15 Drawing Sheets

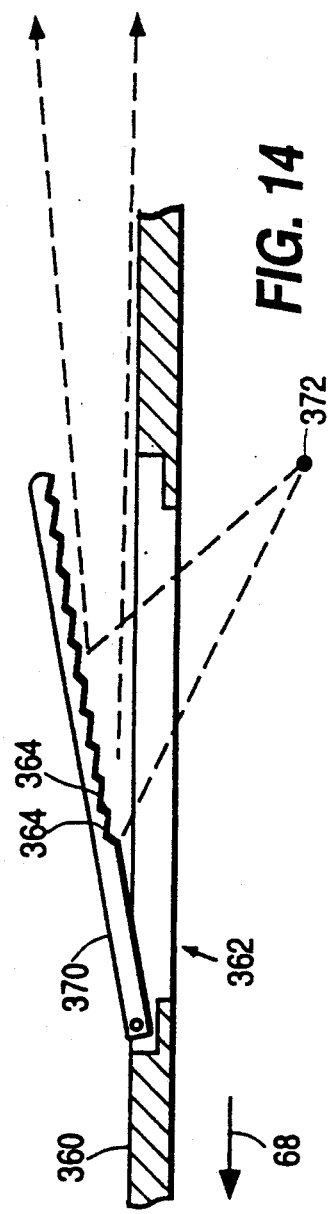
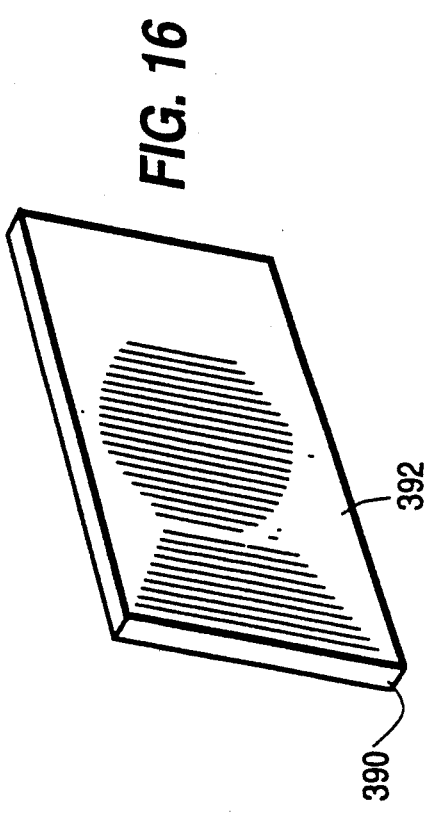

FIG. 17a
PRIOR ART
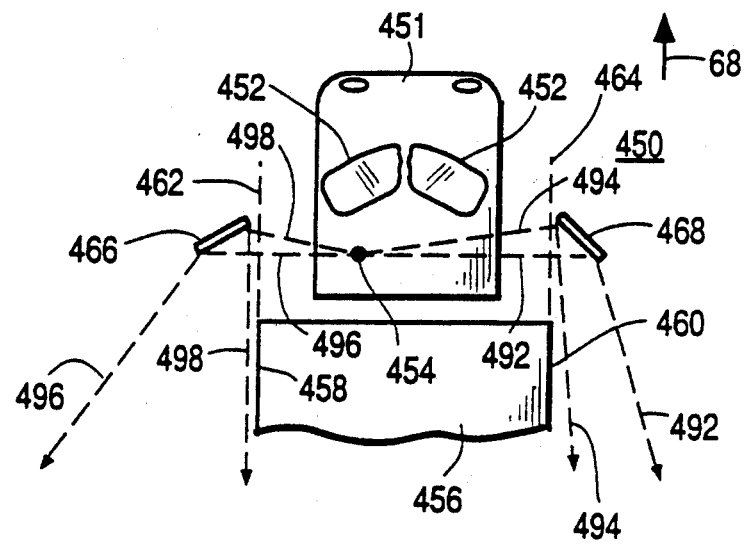
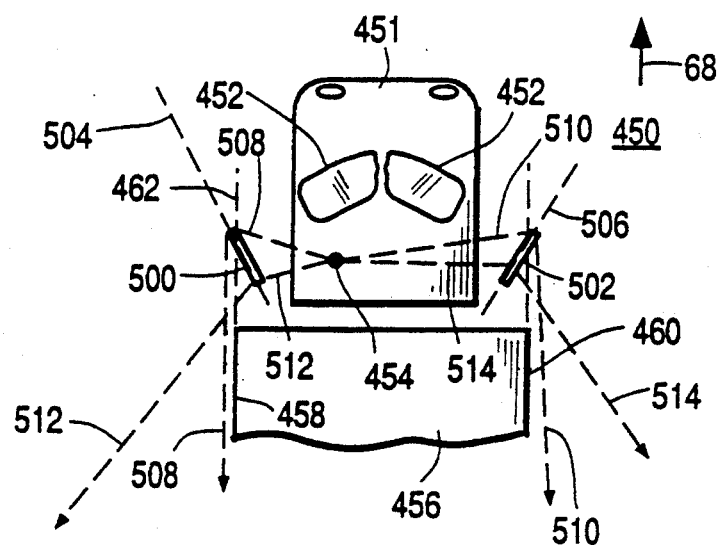
FIG. 17b

REAR-VIEW MIRROR

This invention relates to mirrors such as those used for external rear view in automobiles.

The external rear-view mirrors currently in general use for automobiles are planar, with the plane extending generally away from the automobile body. FIG. 1 is a frontal projection of a Nissan sports car illustrating driver's side and passenger-side external rear-view mirrors 10 and 12, respectively. The rear-view mirrors may be considered not to be stylish. The rear-view mirrors also present a surface area which disturbs the streamline and therefore represents drag when the vehicle is moving. It is desirable to reduce the drag to a minimum in order to maximize fuel mileage. To reduce the drag, the area of the mirror(s) is desirably reduced. Reduction of the mirror area reduces the subtended angle of the mirror as seen at the driver's location, leading to a tendency toward "tunnel" view to the rear.

An improved mirror is desired.

SUMMARY OF THE INVENTION

A mirror for rear view includes an array of a plurality of elongated mirror segments, each defining an axis of elongation. The mirror segments are located with their axes of elongation mutually parallel and with the mirror segments approximately or roughly behind or ahead of an adjacent mirror segment relative to the ordinary direction of motion or of the streamlines of the vehicle with which it is associated. In a first embodiment of the invention, the mirror segments are formed in or on a surface of a side window, canopy or sun roof of a vehicle, thereby completely eliminating the drag of an external mirror. In another embodiment, the mirror segments are formed in or on a plate of transparent material which is mounted outside the vehicle in the airstream, but with the plane of the mirror roughly parallel with the direction of motion rather than roughly orthogonal thereto as in a conventional rear-view mirror, thereby significantly reducing the drag attributable to the external mirror(s). In yet another embodiment, the mirror segments are formed on a sheet of flexible, transparent plastic adapted to be adhesively fixed to a window of a vehicle.

DESCRIPTION OF THE DRAWING

FIGS. 4a and 4b are together referred to as FIG. 4;

FIG. 14 is an elevation cross-section of a sun roof of an automobile including a segmented mirror in accordance with the invention;

FIG. 16 illustrates a flexible transparent sheet incorporating a rear-view mirror array according to the invention; and FIGS. 17a and 17b, referred to jointly as FIG. 17, illustrate plan views of trucks mounted with prior art rear-view mirrors and those according to the invention, respectively, illustrating reduced projection.

DESCRIPTION OF THE INVENTION

Figure 1:
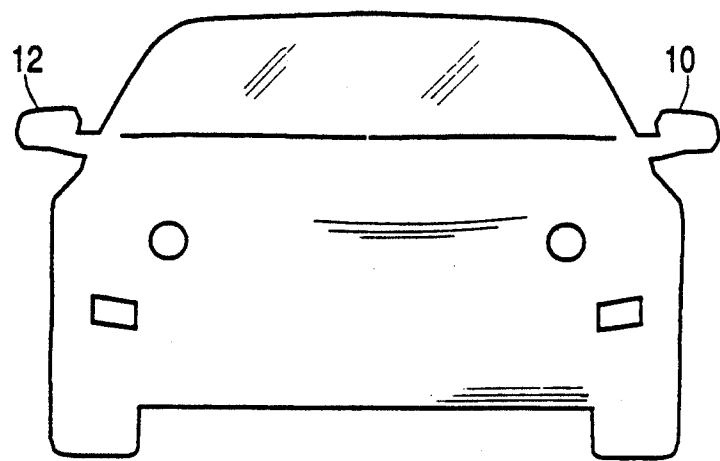
FIG. 1 is a representation of a frontal view of a modern automobile illustrating the projection of the rear-view mirrors.
Figure 2:
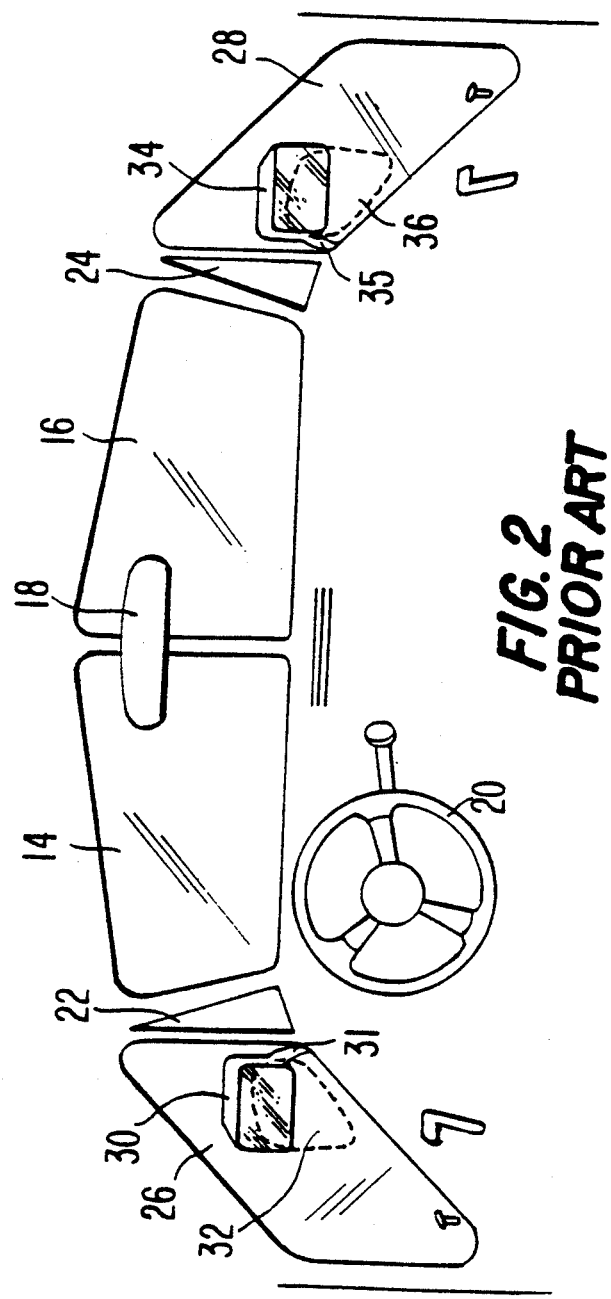
FIG. 2 is a developed interior view of an automobile, illustrating the external rear-view mirrors and projections thereof onto the side windows.

FIG. 2 is a developed view of the interior of an automobile, illustrating left (14) and right (16) windshield portions, interior rear-view mirror 18, steering wheel 20, and left (22) and right (24) vent windows. Also illustrated are a left side window 26 and a right side window 28. A left outside mirror 30 mounted on a support arm 31, when illuminated by the headlights of a car behind, projects a bright region 32 onto left window 26. Similarly, a right outside rear-view mirror 34 mounted on a support arm 35, when illuminated by headlights from the rear, projects a bright region 36 onto right window 28. Illuminated regions 32 and 36 defined on the left and right windows may be viewed as one form of projection of the mirrors onto the windows.

Figure 3A:
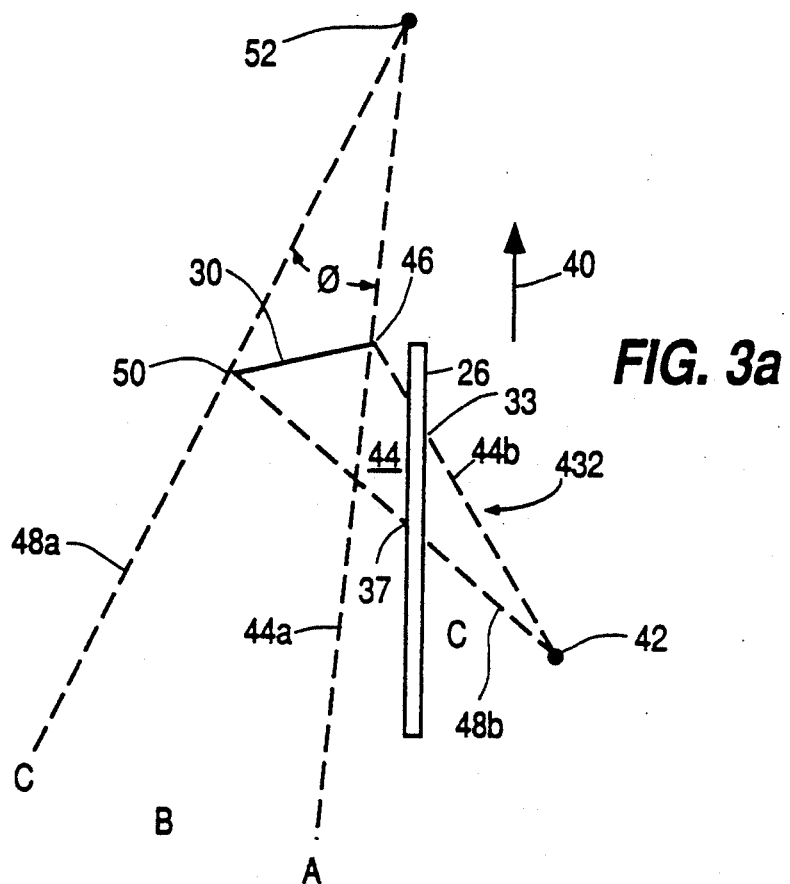
FIGS. 3a and 3b are simplified plan views of the driver's side (left) window of an automobile, together with a conventional rear-view mirror, illustrating lines of sight originating at the driver's location and at infinity, respectively.

FIG. 3a is a simplified plan view of left window 26 and external rear-view mirror 30 of FIG. 2. In FIG. 3a, the ordinary direction of motion of the vehicle is indicated by an arrow 40. A point 42 represents the location of the driver's eyes. As well known to those skilled in the art, the rays incident upon and reflected from a mirror surface make equal angles with a normal to the plane of the mirror's surface. A first ray including portions 44a and 44b represents a light path from a remote exterior object A, ray portion 44a being outside the vehicle and extending between remote object A and inner edge 46 of mirror 30 and ray portion 44b lying between point 42 and the near edge 46 of mirror surface 30. Similarly, another ray including portions 48a and 48b has portion 48a extending between a remote object C and outer edge 50 of mirror 30, and portion 48b extending from point 42 to the far edge 50 of mirror 30. As viewed from point 42 within the vehicle, the reflected image has remote objects A on the right and C on the left.

The view of the exterior as seen in the mirror 30 from the driver's eyes at location 42 is the same view which would be obtained from a point 52 the intersection of continuations of rays 44a and 48a. As illustrated, the rays diverge from point 52, giving a constant-angle view which provides a relatively greater field of view of objects at greater distances from mirror 50. However, reflected objects viewed from location 42 are right-to-left reversed (mirror-image reversed) by comparison with a view from point 52

The remote object (object A) making the smallest acute angle θ relative to the forward direction of the vehicle (i.e. the object which is closest to being behind the vehicle) is reflected from inner edge 46 of mirror 30, and remote object B, making the greater angle θ, is reflected by outer edge 50 of mirror 30. For ease of description, objects such as A making a relatively small acute angle θ with direction of motion 40 are termed "near-in", while objects such as B making 10 a larger angle θ are termed "far-out". As viewed from point 42, the near-in reflected image is projected onto the "leading" edge 33 of projection 432 of mirror 30. Leading edge 33 is at the intersection of ray 44b with window 26, taking the window as having zero thickness. Similarly, from point 42, the reflection of far-out object C from edge 50 of mirror 30 is projected onto lagging edge 37 of projection 432. Lagging edge 37 is at the intersection of ray 48b with window 26.

Figure 3B:
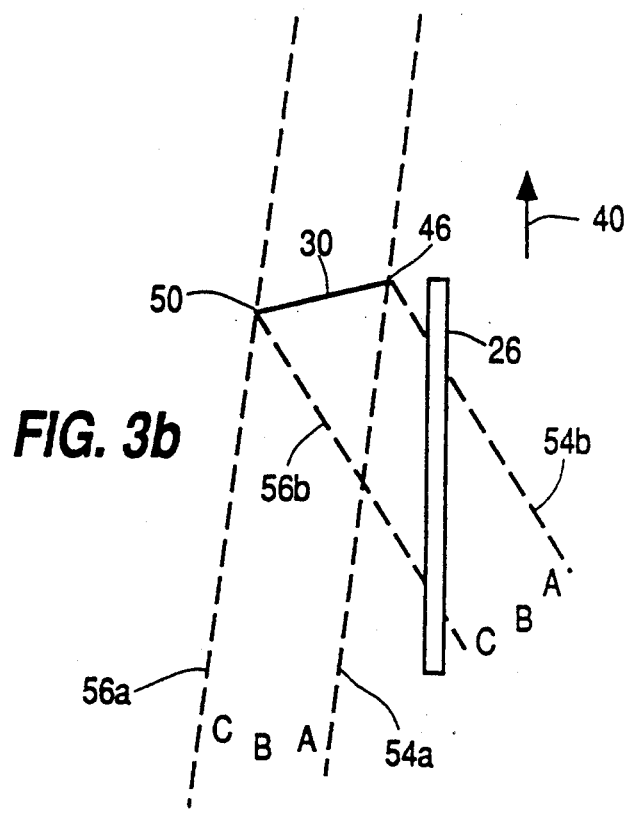

FIG. 3b is similar to FIG. 3a, but the light rays illustrated therein are parallel and do not meet. This is the situation if point 42 of FIG. 3a and objects A and C are at infinity. For example, a first ray 54a and its reflection 54b are parallel to a second ray 56a and its reflection 56b, respectively. While the actual rays in the context of a rear-view mirror converge or diverge as illustrated in FIG. 3a, explanations in terms of parallel rays as illustrated in FIG. 2 are simpler and more convenient, and give results which may be useful for indicating trends.

Figure 4A:
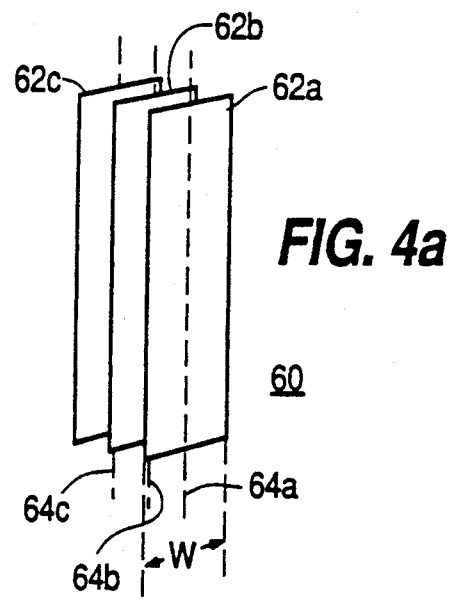
FIG. 4a is a perspective or isometric view of three elongated mirror segments arrayed in accordance with the invention.

FIG. 4a illustrates a mirror 60 according to the invention. As illustrated in FIG. 4a, mirror 60 is an array of a plurality, illustrated as three, of mirror segments 62a, 62b and 62c, the mirrored surfaces of which face out of the sheet. Mirror segments 62a, 62b and 62c are identical, and each is elongated along and centered about an axis of elongation. The axes of elongation of mirror segments 62a, 62b and 62c are 64a, 64b or 64c, respectively. Each mirror segment defines a plane, and the planes are approximately or roughly parallel. The width of each mirror segment 62 is W. Width W ranges from a smaller value to a larger value. The smaller value is on the order of one or a very few wavelengths of visible light, at which a mirror array rather than reflecting in a specular manner causes diffraction. The larger value of W in principle could be of any size but in practice is limited by construction techniques and the desire to see a smooth or continuous image from the viewer's location. A smooth image requires that the angle subtended by each mirror segment be small as seen by the viewer. As described below, the mirror segments may be formed by cutting parallel grooves in a piece of transparent material such as glass, whereupon the maximum value of W is selected so as not to weaken the glass too much which may be about 0.1 inch for 0.25 inch glass.

Figure 4B:
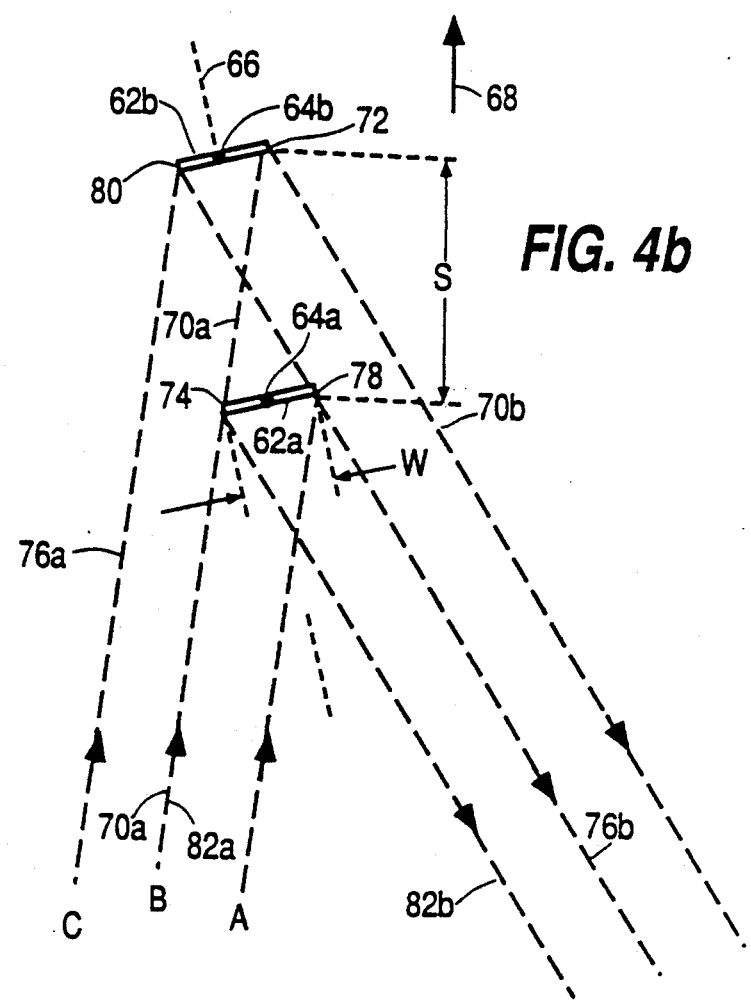
FIG. 4b is a simplified plan view of two of the mirror segments of FIG. 4a illustrating specular reflection paths.

FIG. 4b is a plan view of a portion of the structure of FIG. 4a, looking down at axes of elongation 64a and 64b. Axes of elongation 64a and 64b lie in a common plane 66, which is orthogonal to the plane of the paper in FIG. 4b. Plane 66 is generally vertical and oriented with its edge directed generally in the direction 68 of motion of the vehicle (not illustrated) on which it is mounted. Direction of motion 68 may lie in plane 66. As illustrated in FIG. 4b, the viewer of the mirror is to the right of plane 66, and the scene being viewed, including remote objects A and C, is to the left. Mirror segments 62a and 62b are spaced by spacing S, which may be measured parallel to plane 66 or to direction 68 as appropriate. Spacing S may range from a few wavelengths of light to, in principle, any dimension, but is desirably in the range of 30 to 150 lines per inch. A light ray 70b from remote object B just clears the outside (left) edge 74 of mirror segment 62a and reflects from inner edge 72 of mirror segment 62b, and reflected ray 70b continues to the viewer. Another light ray 76a originates from object C and reflects from outer edge 80 of mirror segment 62b to form reflected ray 76b, which just clears inside edge 78 of mirror segment 62a. A third light ray 82a from object B, which substantially coincides with or is immediately adjacent to light ray 70a, reflects from outside edge 74 of mirror segment 62b to form a ray 82b which continues on to the viewer.

Figure 5:
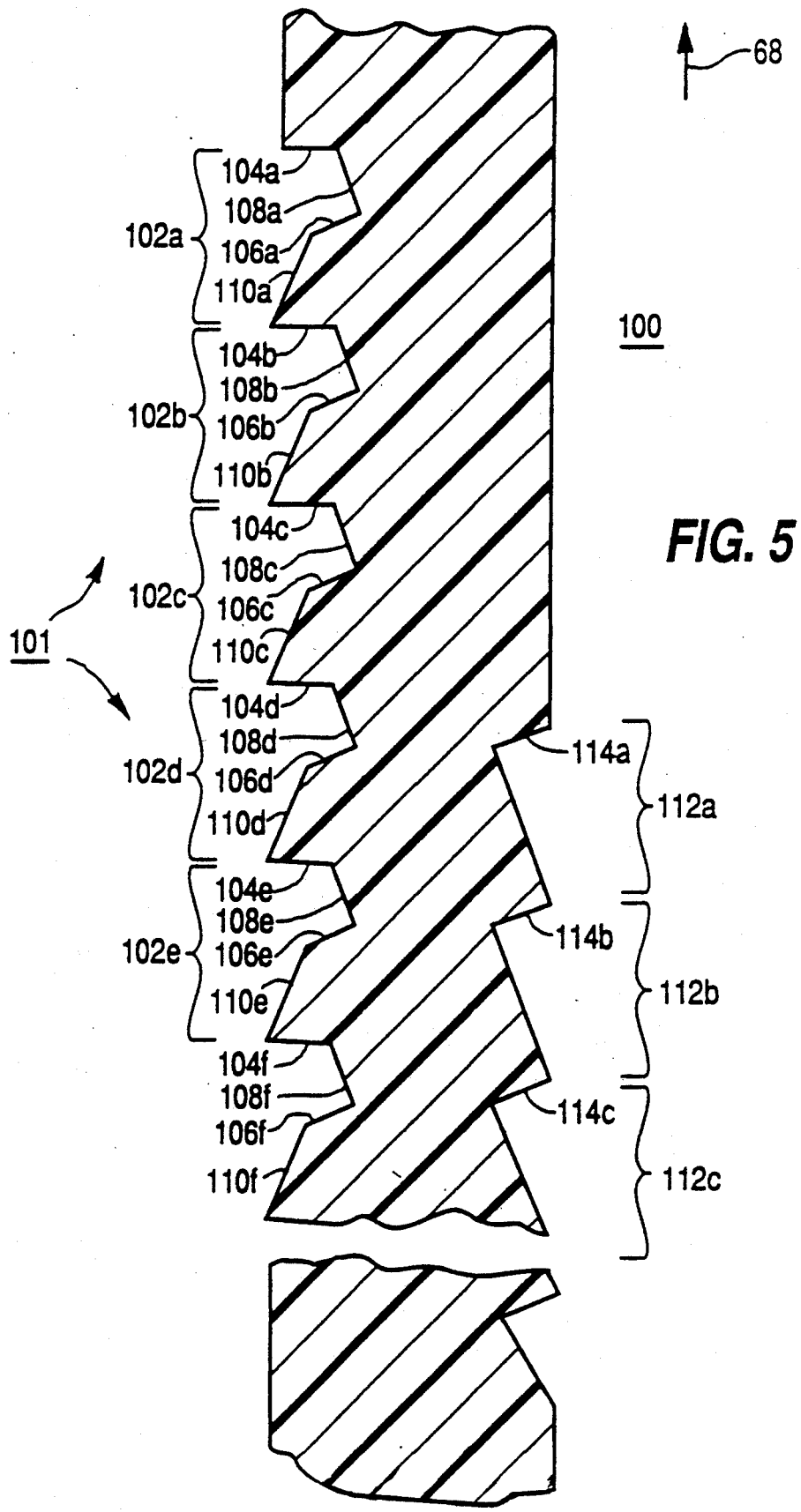
FIG. 5 is a plan section of a driver's side window of a vehicle according to the invention, illustrating parallel vertical grooves defining facets.

The mirror arrangement of FIGS. 4a and 4b provides a rear view, and the projected frontal area of the mirror segments is less than that of a single conventional rear-view mirror. If direction of motion 68 lies in (or is parallel to) plane 66, the projected frontal area of the array of mirror segments is only that of one mirror segment, no matter how many segments the array may include. FIG. 5 is a plan view, sectioned, of a portion of a driver's side window 100 formed to provide a mirror array 101 of reflective surfaces corresponding to those of FIGS. 4a and 4b. In FIG. 5, the bulk of window 100 is made from a transparent material such as glass or optical plastic. Mirror array 101 is defined by a plurality of vertically oriented grooves 102a, 102b, 102c . . . ("102"), which are formed by vertical, mutually parallel cuts, to define flat vertical faces or facets such as 104a, 104b, 104c. . . ("104") which are the facets which are light-reflecting. The facets may be made light-reflecting by a metallization. A further set of facets 106a, 106b, 106c . . . ("106") have their flat surfaces approximately orthogonal to the reflected light rays, described below. Further facets 108a, 108b, 108c . . . ("108") interconnect the inner ends of facets 104 and 106 and are in general parallel to the reflected light rays, as described below. Facets 110a, 110b, 110c . . . ("110") interconnect the outer ends of facets 104 and 106, and are generally parallel to light rays approaching or leaving reflective surfaces 104.

Also in FIG. 5, the right side of window 100 defines a set of triangular notches 112a, 112b, 112c . . . ("112"), each of which defines a facet 114, such as 114a, 114b, 114c . . . which is generally orthogonal to the direction of reflected light rays.

Figure 6:
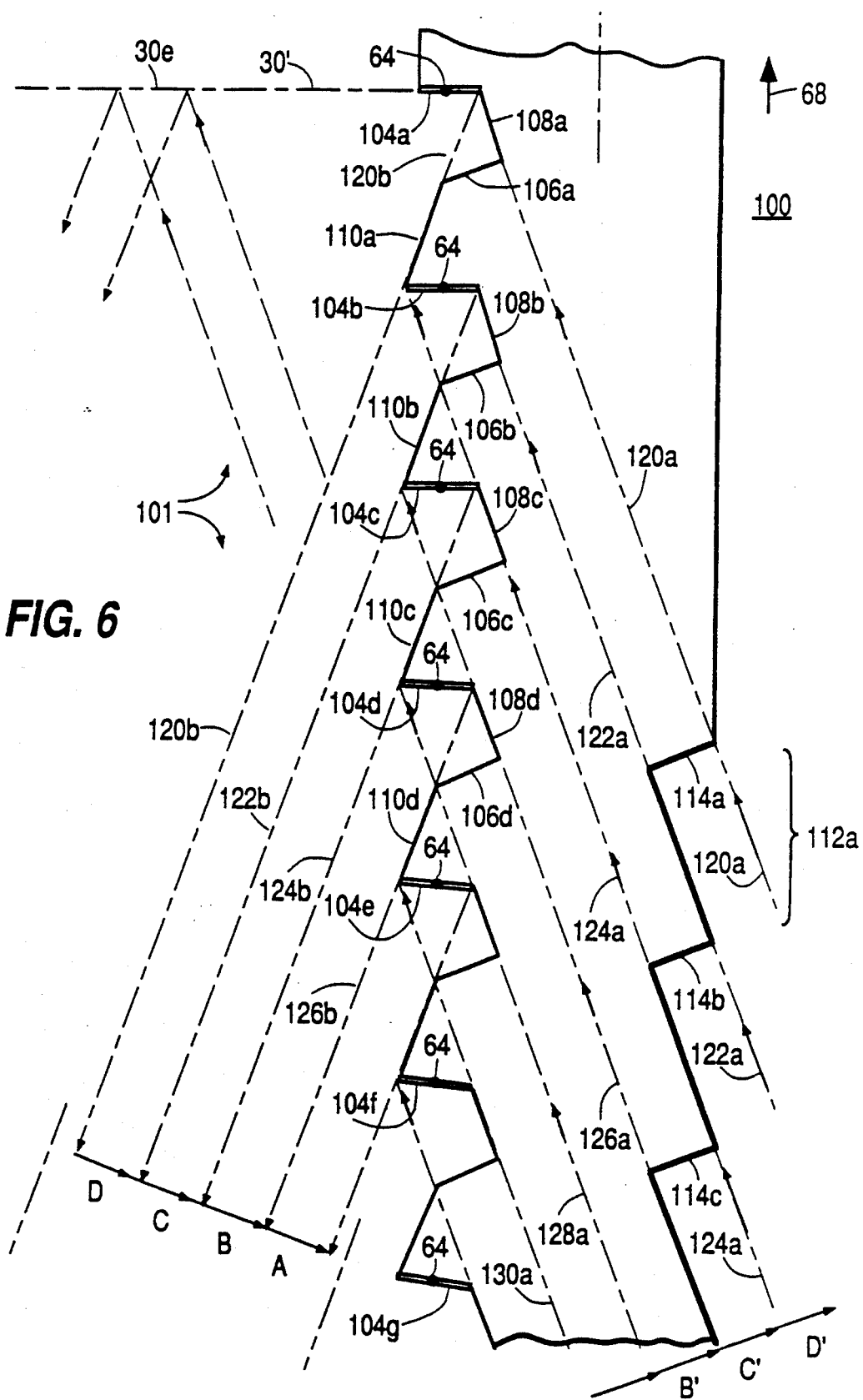
FIG. 6 is a view similar to FIG. 5, tracing parallel light rays.

FIG. 6 is similar to FIG. 5, but illustrates the paths of certain parallel light rays. Elements of FIG. 6 corresponding to those of FIG. 5 are designated by the same reference numerals Those skilled in the art know that the propagation of electromagnetic energy, of which light is one form, is reciprocal, and that descriptions may be couched in terms of propagation in either direction, the other direction of propagation being understood. In FIG. 6, parallel light rays 120a, 122a, 124a, 126a, 128a and 130a enter (or leave) the glass through orthogonal facets 114a, 114b, 114c . . . . Facets 114 eliminate the effects of refraction due to the glass-air interface and facilitate the explanation, but the effect of refraction may be advantageous as described below, and grooves 112 on the right or inside of the glass may be eliminated if 100 at facet 114b and propagates through the transparent material, exiting at facet 106b. Ray 122a propagates parallel to the surface of facet 108b until it impinges on the inner edge of reflective facet 104b, whereupon it reflects and propagates along path 122b, parallel with facet 110b, and to a junction with the "head" of an arrow representing a remote object D. A ray 124a enters the material of the window at facet 114c, exits at facet 106c, and thereafter propagates parallel to the surface of facet 108c until it reflects from the inner edge of facet 104c to form ray 124b. Ray 124b propagates parallel to the surface of facet 110c and falls on the "head" of remote object C. Similarly, ray 126a, parallel with ray 124a, exits at facet 106d, propagates parallel to the surface of facet 108d, and reflects from the inner edge of reflective facet 104d to form ray 126b, which propagates parallel with a surface of facet 110d to fall on the head of remote object B. Reflected objects B', C' and D' are illustrated at the lower right of FIG. 6, in the positions which they assume when viewed in the mirror. Analyzed by using parallel ray paths as above, the reflected image D' of object D is to the right of reflected objects B' and C' as viewed by someone to the right of window 100, contrary to what a nonsegmented mirror (such as that suggested by phantom reflective surface 30') would show. It is clear that the "head" of reflected object C' is adjacent the "tail" of reflected object D', contrary to the actual positions of the objects. Thus, the mirror is noninverting according to parallel-ray analysis.

While the parallel-ray analysis in relation to FIG. 6 is useful in understanding details of the configuration of the various facets of mirror 101, it is clear that in an actual rear-view mirror situation the distortion will not occur. This may be readily understood by considering that if each reflective facet 104 of mirror 101 is parallel to the other facets and also parallel to prior-art rear-view mirror 30', and rays 120–130 make the same angles therewith as with corresponding segments, such as segment 30e, of mirror 30', then the reflections will be from the same angular direction. For objects at a substantial distance from the mirror, the difference between the physical positions of the mirror segments of mirror array 101 and those of prior art mirror 30 will not be significant. Thus, for objects at infinity, leading mirror segments 104a and 104b will in actuality reflect images from near-in objects, and the relatively lagging mirror segments, such as 104d and 104e, will actually reflect rays from far-out objects For objects at intermediate distances, or if the location of the viewer of the mirror is relatively far from the facets of mirror array 101 so as to give a tendency toward parallel rays, there may be some minor distortion. This distortion may be corrected by slightly rotating leading mirror facets such as 104a counterclockwise (as viewed from above in FIG. 6), and/or slightly rotating lagging facets such as 104e slightly clockwise, to thereby overcome any tendency toward parallel rays. This rotation of facets may be viewed as causing the corresponding rays to "cross" at some point in space.

Figure 7:
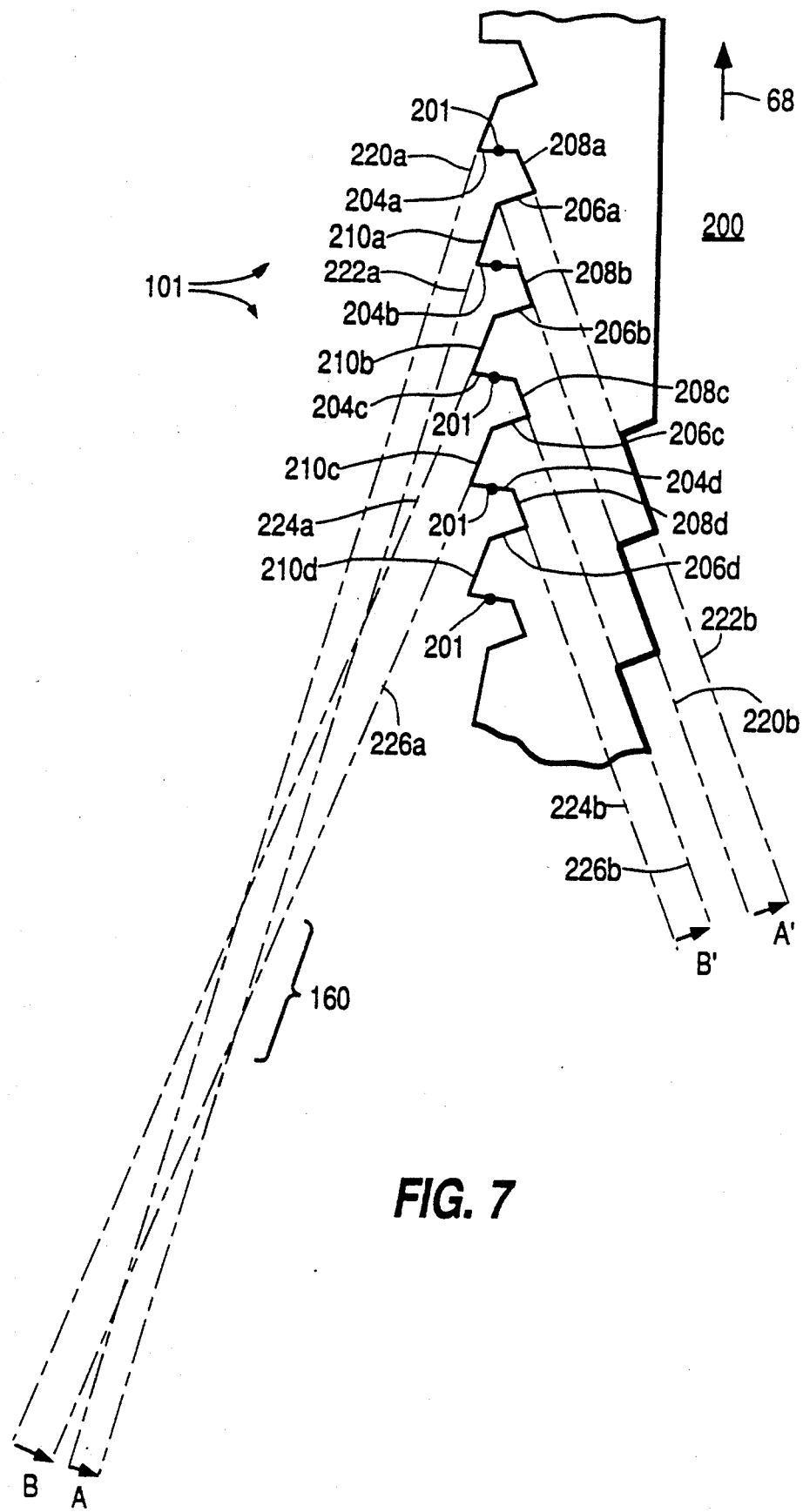
FIG. 7 is a view similar to FIG. 6, in which the light paths cross outside the vehicle.

FIG. 7 is a plan view of a portion of a driver's side window 200 in an embodiment of the invention in which tilting of the mirror segments restores the image's right-to-left reversal. In FIG. 7, the reflective facets 204 are not mutually parallel, but at least some are rotated about their longitudinal axes 200 so that the rays from adjacent mirror segments cross. As illustrated, the rays 220 and 222 reflected by the outer and inner edges, respectively of mirror segment 204a cross rays 224 and 226 reflected from the outer and inner edges, respectively of reflective facet 204c. The crossing occurs in a region 160. Remote objects A and B more distant than crossover region 160 are reflected as objects A' and B' in their proper order and mirror-reversed, just as would be expected from a nonsegmented planar mirror In the context of a driver on the right of window 200, looking through the window glass at array 101, facet 204a farthest from the driver provides a view of close-in object A, and facet 204c closer to the driver provides a view of relatively far-out object B. By reference to FIG. 3a, it will be seen that this order corresponds to that for an ordinary mirror, so little tendency exists for right-to-left inversion.

Figure 8A:
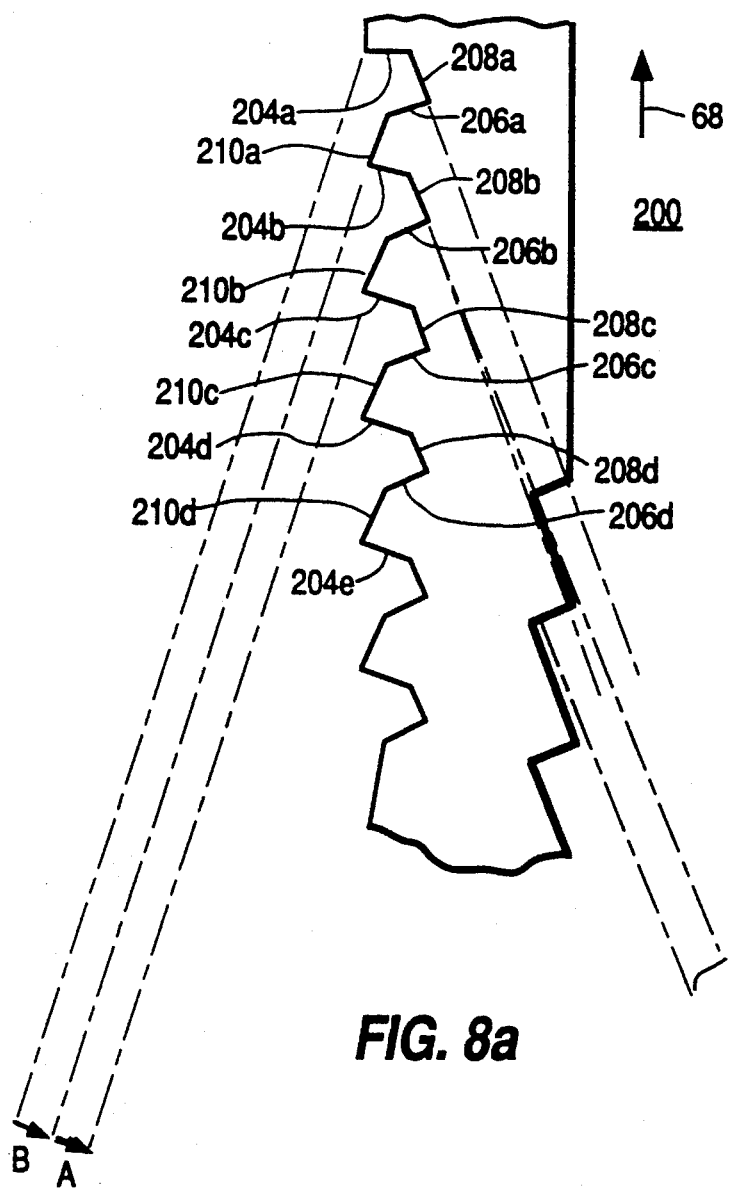
FIGS. 8a and 8b are views similar to FIG. 6, in which the light paths cross inside the vehicle.
Figure 8B:
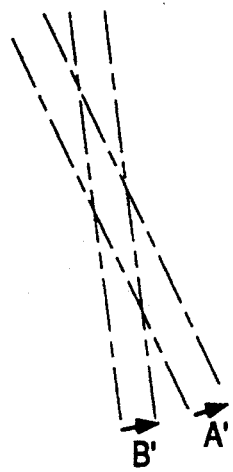

FIG. 8 illustrates a plan view similar to the plan view of FIG. 7, in which the crossover of rays occurs to the right of structure 200, i.e., within the vehicle. As can be seen, the right-to-left ordering of the image is correct, regardless of the side of the glass on which the crossover takes place.

The angles of the reflective surfaces are readily determined, and depend upon the location of the viewer relative to the rear-view mirror, and the angles at which the reflected rays are to be directed It should be noted that since the viewer may be closer to at least some facets or portions of the inventive mirror than to a prior art mirror, a mirror according to the invention which is of the same overall size may provide a greater field of view than an ordinary rear-view mirror, because the angle subtended by the mirror at the point of observation is greater.

The spacing S of the mirror segments one from the other is determined by geometrical and optical considerations. The line spacing or segment-to-segment spacing has a minimum value established by diffraction considerations and a maximum value established by the desire for a smooth image; 30 lines per inch may be satisfactory but 50 or more may be better for ordinary distances. Referring to FIGS. 5, 6, 7 or 8, the illustrated rays 120–126 or 220–226 and geometry allow each reflective surface 104 or 204 to be fully utilized If the viewer were to lean forward, the angle made between direction of motion 58 and rays extending between window 100 or 200 and the viewer would be less acute, with the result that some rays would not intersect a mirror surface 104 or 204 at all, but would pass directly through the glass of window 100 or 200 as though rear-view mirror array 101 were not there. At the limit, where the viewer's position is such that the rays are about normal to the direction of motion 68 or to the plane of window 100 or 200, most rays pass through the window without striking a reflective surface. This gives rise to the possibility, when the mirror is made a part of the side window, that the rear-view mirror portion may be made to subtend a much larger angle than with the conventional mirror to provide a much greater field of view, since when looking out to the side through the mirror it becomes at least partially invisible. It should be noted, however, that at certain other angles, the mirrors may be shadowed by the rear of the next adjacent mirror, so that the window becomes opaque, i.e. neither reflective nor transmissive. These disadvantageous angles of view, however, tend to occur when attempting to view very near-in objects, as opposed to somewhat more far-out objects, as would be the case when changing lanes An exterior-mounted mirror array according to the invention may be canted a few degrees to allow a view directly to the rear with minimal shadowing.

Figure 9:
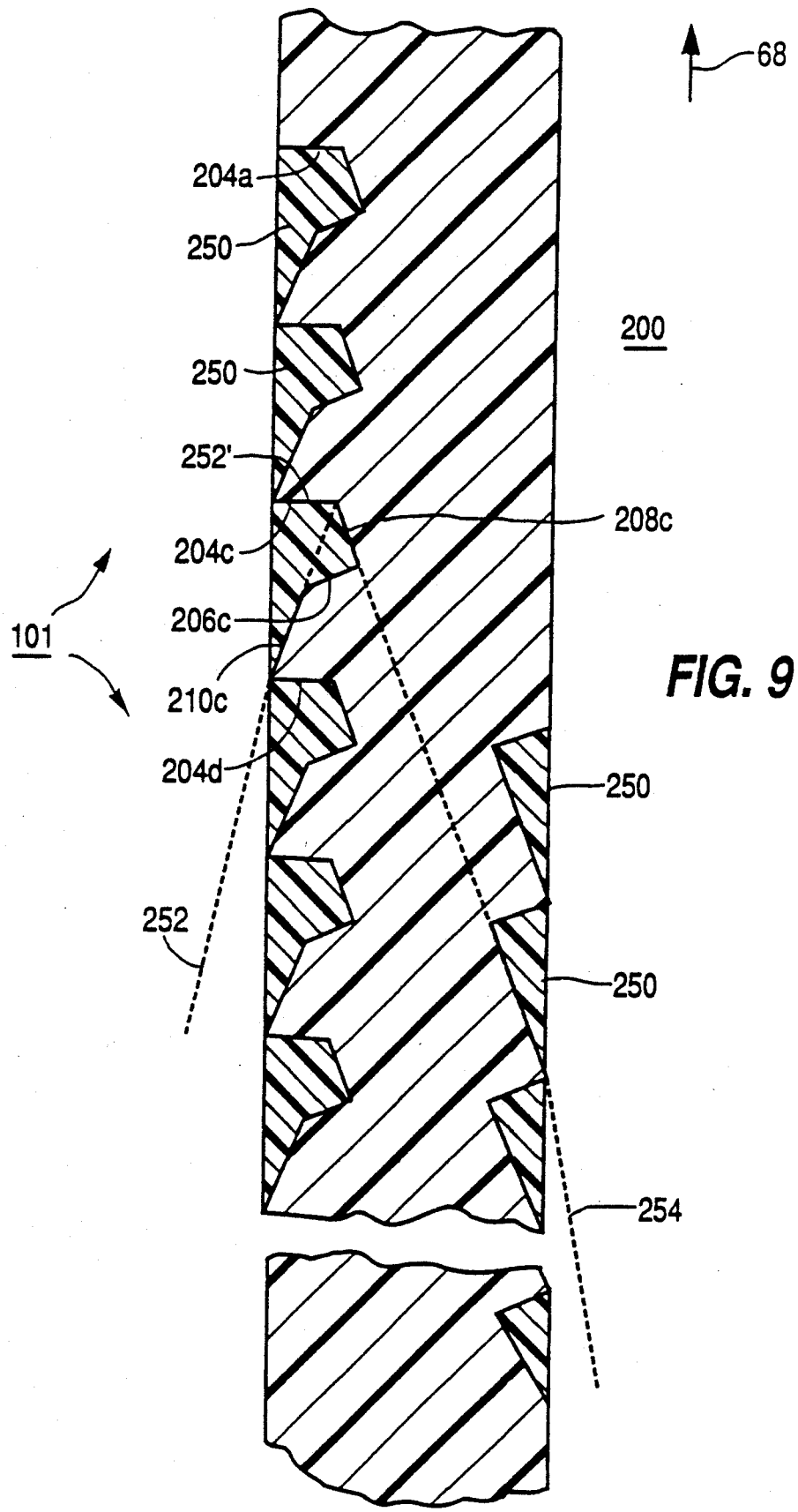
FIG. 9 is a view similar to FIG. 6, in which the surfaces of the rear-view mirror are smooth.

It is desirable to have a smooth mirror surface, to aid in maintaining cleanliness. FIG. 9 illustrates a structure similar to that of FIGS. 7 or 8, with a transparent material filling the grooves defining the facets. In FIG. 9, the fill material is designated 250. The dielectric constant n of material 250 may be similar to that of glass ($n \approx 3$). Unlike the situation in a plane mirror or a window, the effects of refraction attributable to the dielectric constant of the material do not cancel in a structure according to the invention. As mentioned, at certain angles of view shadowing of a mirror by the back of the next adjacent mirror may tend to occur. The refractive effect is illustrated by a ray 252 which enters material 250 just at the edge of reflective facet 204d. This ray, in the absence of material 250, would fall on mirror segment 204c at a point 252, thus leaving a portion of the mirror segment, namely that portion to the inside relative to point 252, in shadow. The refraction bends the light ray inward, so that it proceeds along interior interface surface 210c to intersect mirror segment 204c near its intersection with facet 208c, thereby reducing the shadowing. This makes it clear that the many facets 204, 206, 208 and 210 are not necessary except for an understanding of the mirror, and ideally the mirror segments should be formed within a homogeneous block of transparent material.

It should also be noted that the reflection of ray 252, designated 254 in FIG. 9, is bent to a more acute angle as it exits refractive material 250 Thus, from the point of view of the person viewing the mirror, refraction makes it possible to view mirror array 101 at a more acute angle than might otherwise be possible, for a given amount of shadowing.

Figure 10A:
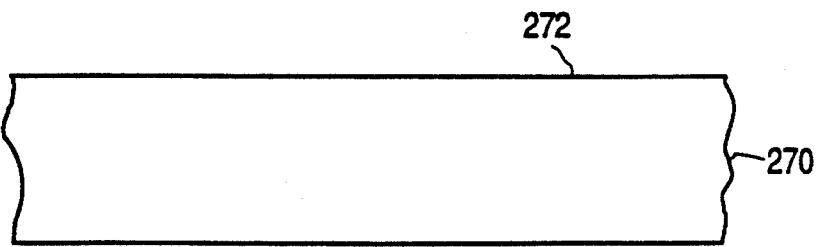
FIGS. 10a, b, c, d and e are plan sectional views of a transparent plate illustrating steps of a method for fabrication of a faceted transparent structure with reflective surfaces.
Figure 10B:
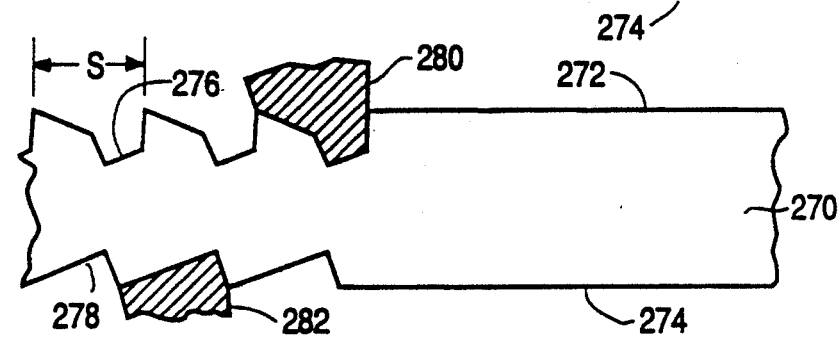
Figure 10C:
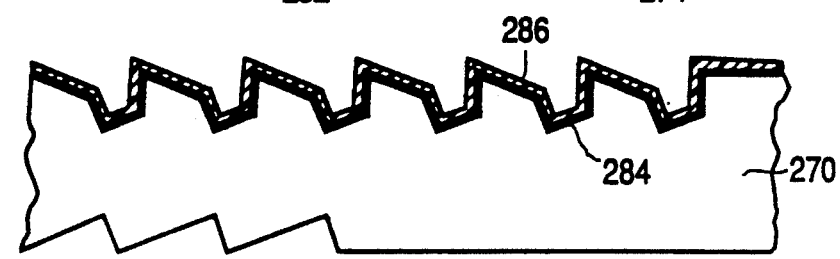
Figure 10D:
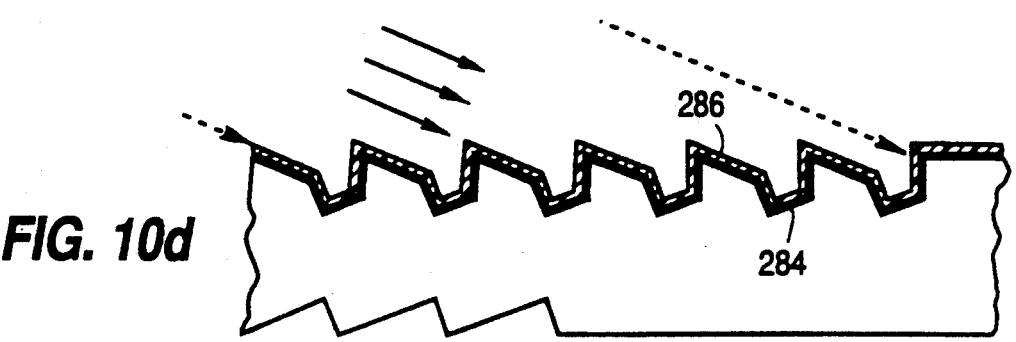
Figure 10E:
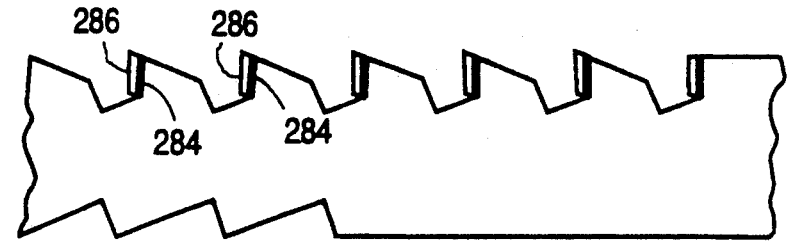

FIGS. 10a-c (where the hyphen represents the word "through") represent steps in a process for making a structure such as that illustrated in FIGS. 5-9. FIG. 10a represents an edge view of a sheet 270 of transparent material with upper and lower surfaces 272 and 274, respectively. FIG. 10b represents the cutting of elongated grooves 276 and 278 into surfaces 272 and 274, respectively, with cutting tools 280 and 282, respectively. The tool may be an indexed shaper. The entire upper surface is coated with a metallization 284, and the metallization is coated with a photoresist layer 286, as illustrated in FIG. 10c. FIG. 10c illustrates exposure of photoresist 286 to light incident from an angle which illuminates substantially only the surface over the desired mirrored facet The unexposed photoresist is washed away, and the exposed metallization is etched away to leave exposed photoresist overlying metallization on certain facets, as illustrated in FIG. 10e. The remaining photoresist 286 is removed, leaving the mirrored facets. The grooves may then be filled with a curable optical plastic, if desired.

Figure 11A:
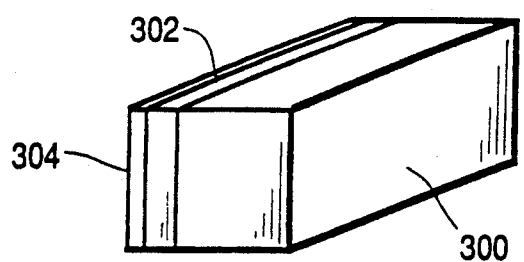
FIG. 11a illustrates an elongated rectangular transparent block mirrored on one surface.
Figure 11B:
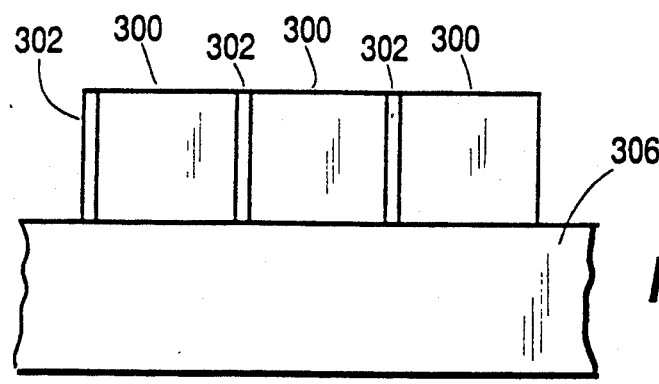
FIG. 11b illustrates an array of such blocks on a support surface.
Figure 11C:
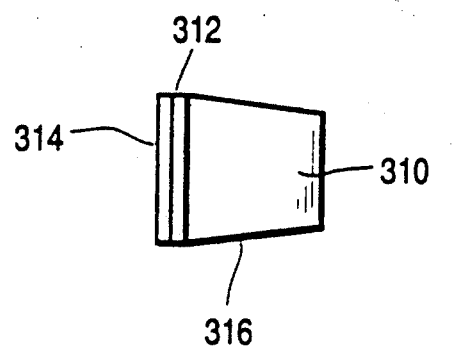
FIG. 11c illustrates a block which when mounted tilts the mirrored surface relative to the support surface.

FIGS. 11a, b and c together illustrate another fabrication technique. In FIG. 11a, an elongated transparent block 300 is metallized (silvered or aluminized) at 302, and has deposited over the metallization a layer 304 of transparent adhesive A number of such blocks are adhesively affixed to each other and to the flat surface of a transparent support 306. FIG. 11c illustrates an end view of a block 310 similar to block 300 but in which lower surface 316 is not orthogonal to the plane of metallization 312. When affixed to the surface of support 306, a gap will result between the top of metallization 312 and the next adjacent block. Adhesive layer 314 is made thick enough to fill the gap, to prevent optical fringing or vignetting.

Figure 12A:
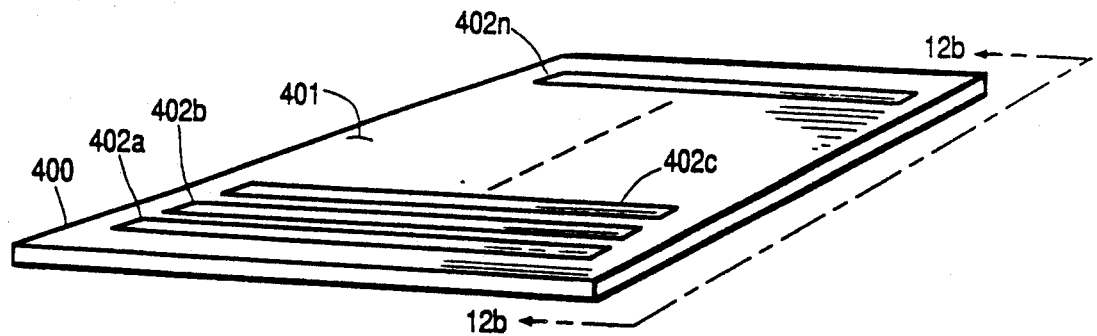
FIGS. 12a, b, and c illustrate various steps in the process of making a mirror according to the invention from a deformable transparent sheet.
Figure 12B:
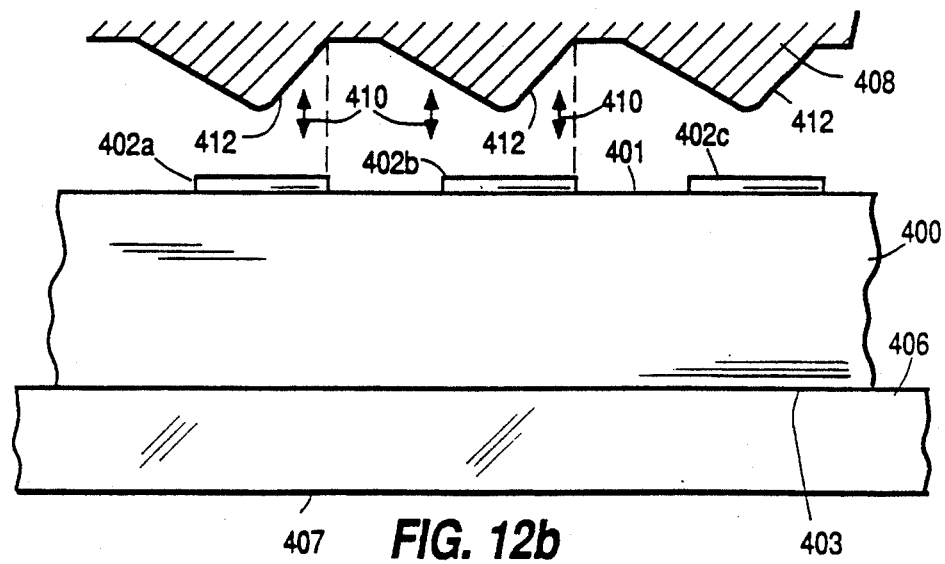
Figure 12C:
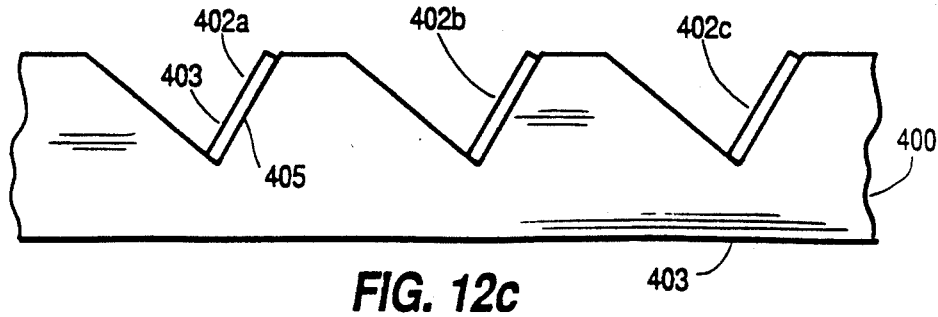

FIGS. 12a, b and c together illustrate yet another method for making a mirror according to the invention. In FIG. 12a, a sheet 400 of deformable plastic bears on its upper surface 401 a printed or deposited pattern of elongated metallic strips 402a, 402b, 408c. . . 402n. FIG. 12b illustrates a portion of sheet 400 and strips 402a, 402b, and 408c, viewed along lines 12b-12b in FIG. 12a. Bottom surface 403 of sheet 400 is supported by or bears against a flat surface 406. Flat surface 406 may be the upper surface of a piece of glass 407 to which plastic sheet 400 is bonded, or 407 may be a simple backing plate of a press which includes a shaped die 408 movable in the direction of arrows 410 relative to surface 406. Die 408 has a 3-dimensional recurring surface pattern which includes inclined portions 412, the right edges of which are indexed over the right edges of strips 402. When die 408 is pressed against deformable plastic strip 400, the plastic deforms to the shape illustrated in FIG. 12c. In FIG. 12c, the reflective surfaces used for the rear-view mirror may be the surfaces, such as surface 403 of strip 402a, which are contacted by die 408. However, the opposite surface, such as surface 405 of strip 402a, may be a more perfect reflector. Either surface may be used.

Figure 13:
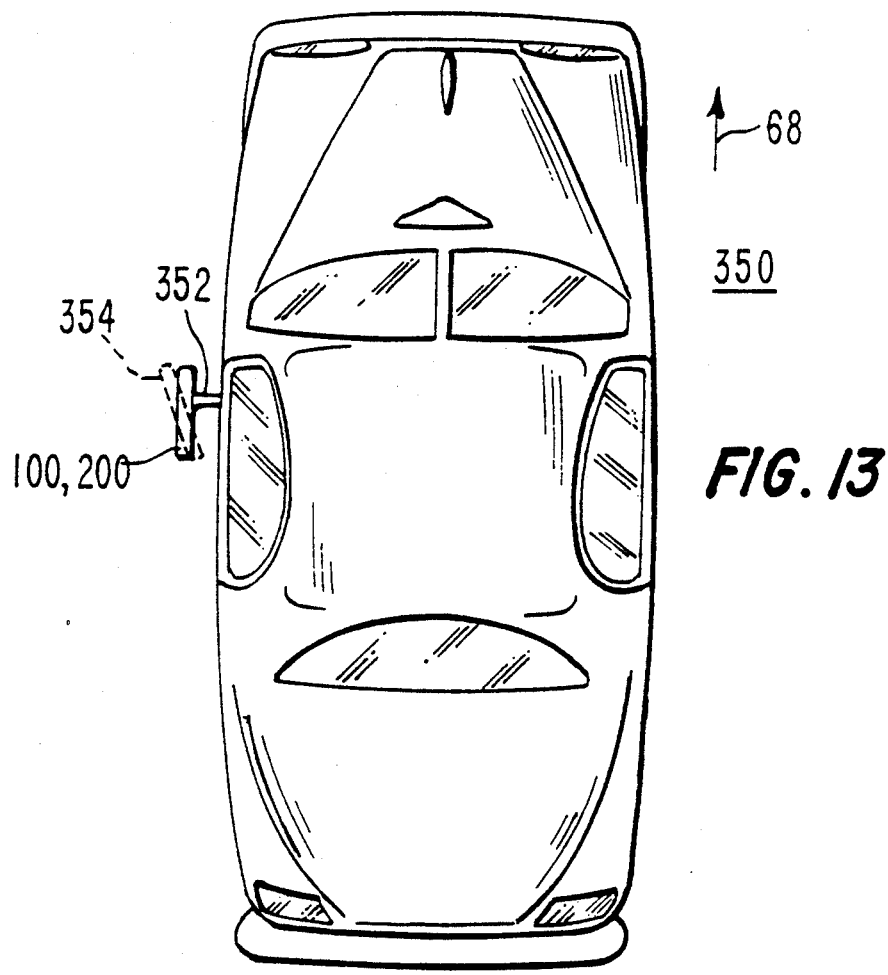
FIG. 13 is a plan view of an automobile using an external rear-view mirror according to the invention, illustrating reduced frontal projection.

FIG. 13 is a plan view of an automobile 350, the normal direction of motion of which is indicated by arrow 68. A support illustrated as 352 holds a driver's side rear-view mirror array 100 or 200 in a suitable location outside the vehicle, providing a relatively low frontal area for low drag. Mirror 100 or 200 is similar to the structure described in FIGS. 4-9. As mentioned, it may be desirable to cant the mirror somewhat, as illustrated by dotted outline 354, to provide improved view of near-in objects. A right side mirror may also be used. The mirrors may of course be made remotely adjustable in known manner.

FIG. 14 is an elevation cross-section taken through the roof 360 of a vehicle proceeding to the left in direction 68. An aperture 362 defined in the roof is covered by a sunroof 370, which may be opaque or transparent. A plurality of notches 364 in the lower surface of sunroof 370 are reflective, and oriented to provide a view to the rear. The angles of the facets are selected so that rays from the viewer's location 372 which are reflected by more leading facets are reflected downwardly, while rays reflected from more lagging facets are more horizontal or even upwardly directed, thereby providing an erect image. If sunroof 370 is transparent, light ingress from above is unaffected.

Figure 15:
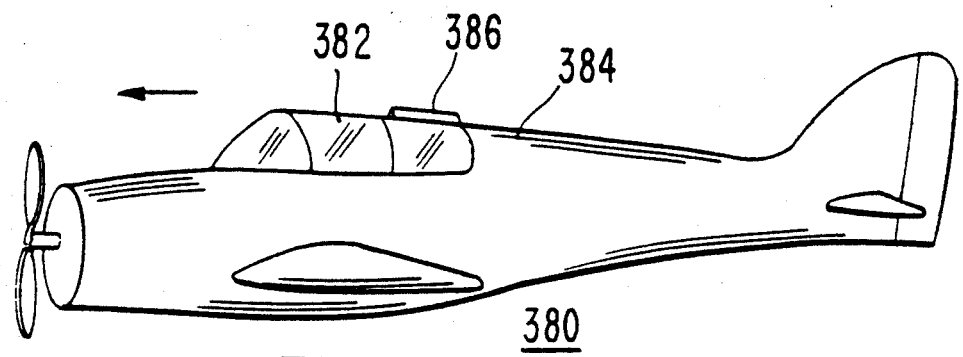
FIG. 15 is an elevation view of an airplane including a canopy with a segmented mirror according to the invention.

FIG. 15 illustrates an airplane 380 with a canopy 382. A view directly to the rear is not possible, because of aircraft body portions 384. A mirror 386 according to the invention may be used above the canopy as illustrated, or to the left or right, to provide a substantial rearward view.

FIG. 16 illustrates a flexible transparent plastic piece 390, embossed on the rear side 392 with vertical grooves, facets of which are metallized as described in conjunction with the invention. The reverse side (not visible in FIG. 15) of sheet 390 is coated with a transparent contact adhesive and a removable nonadhesive paper to keep the adhesive clean until applied.

A salient advantage of an external rear-view mirror according to the invention is described in conjunction with FIGS. 17a and 17b. FIG. 17a illustrates a plan view of the forward portion 451 of a truck 450 with windshields 452 and a driver's location 454. A truck body or trailer 456 is wider than forward portion 451, and has left and right sides 458 and 460, respectively, which project past the sides of forward portion 451 of truck 450, as illustrated by dashed lines 462 and 454, respectively. A conventional or prior art rear-view mirror 466 is mounted on the left of truck 450, and a similar mirror 468 is mounted on the right, both at locations at which they can be seen by the driver at location 454. Reference to FIG. 3c shows that near-in objects are reflected by the inner edge of a conventional mirror, so the near edges of mirrors 466 and 468 are mounted at, or somewhat outside of, the projections 462 and 464 of sides 458 and 460, respectively, of body or trailer 456. The remainder of the mirror projects into the airstream even beyond the truck body, so that far-out objects may be viewed. From driver's location 454, a ray 498 reflects from the near edge of left mirror to give a view of near-in objects, and a ray 496 reflects from the outer edge of mirror 466 to give a view of far-out objects. Similarly, a ray 494 reflects from the inner edge of right mirror 468 to give a view of near-in objects, while a ray 492 reflects from the outer edge of right mirror 468 to give a view of far-out objects. Thus, the mirrors are not only in the airstream to cause drag, but they project beyond truck body 456 to increase the effective width and make navigation more difficult. In the case of a removable trailer, the prior art arrangement bears mirrors in which the outer edges project beyond the trailer, thereby increasing the effective width of the forward portion even beyond that of its trailer.

FIG. 17b illustrates a truck similar to that of FIG. 17a using external mirrors 500 and 502 according to the invention. As illustrated, the mirrors are mounted with their planes 504 and 506, respectively, making an acute angle with the forward direction 68 of the truck. For this purpose, planes 504 and 506 are the planes of the axes of elongation of the mirror segments of the array. The planes 504 and 506 of mirrors 500 and 502 could, if desired, be mounted parallel to direction of motion 68. Since the near-in view can be provided by the leading reflective surface (not separately illustrated in FIG. 17b) of the mirror, the leading edges of mirrors 500 and 502 are mounted at, or just outside of, the projections 462 and 464, respectively, of sides 458 and 460 of truck body or trailer 456. The left and right near-in views from driver's location 454 are illustrated by rays 508 and 510, respectively. The lagging reflective surfaces (not illustrated in FIG. 17) of mirrors 500 and 502 can provide a far-out view, as discussed in conjunction with FIGS. 4–9. The lagging portions of mirrors 500 and 502 of FIG. 17b can be located anywhere giving a clear field of view in the desired direction, even inside projection lines 462 and 464. The far-out views are illustrated by rays 512 and 514, respectively.

Thus, the outermost projection required of mirrors according to the invention is seen to be at essentially the same location at which the innermost edge of a prior art mirror lies. This results in greatly reduced drag under most conditions, and reduces some forces which the mirror mounting structure must withstand. Those skilled in the art will understand that this provides greater structural reliability for a mounting having the same structural elements, or the possibility of reduced-cost structures of similar reliability to current mountings. The reduction of overall drag to provide increased fuel mileage is also provided.

Other embodiments of the invention will be apparent to those skilled in the art. For example, arrays of segmented mirrors according to the invention may be used in conjunction with side windows which are curved to match the general contour of the automobile and may provide a suitable rear view when associated with generally vertical window portions. Electrical strip heaters may be associated with side windows near the rear-view mirror for keeping the mirror clear of snow and ice during inclement weather. Widths W may differ from segment to segment along the length of the mirror array, and the mirror segment angles and segment-to-segment mirror spacings S may also differ, to provide the desired view. Anti-reflection coatings may be used as required. While incorporation into a side window has been described, the mirror according to the invention may also be incorporated into a vent window, so that rolling down the conventional side window does not cause the mirror to disappear.

What is claimed is:

1. A vehicle with a side rear-view mirror, comprising;
a plurality of elongated, generally planar mirror segments, each of said mirror segments having an axis of elongation lying in the plane of the mirror segment, said plurality of mirror segments being arrayed in an array direction, with said axes of elongation approximately parallel and with said planes of said mirror segments approximately parallel, to form a mirror array; and
mounting means for holding said mirror array at a side of said vehicle in a location which is viewable by a vehicle operator, said mounting means holding said mirror array with said array direction approximately parallel to the direction of motion of said vehicle.

2. A mirror according to claim 1 wherein said mirror segments are mutually parallel.

3. A vehicle according to claim 1 wherein each of said mirror segments has a width in a direction transverse to its axis of elongation, and said widths of said mirror segments are identical.

4. A vehicle according to claim 1 wherein said mirror segments of said mirror array are supported in said array by a support means, and said support means comprises a monolithic transparent structure.

5. A mirror according to claim 4 wherein said transparent structure comprises a plastic material.

6. A mirror according to claim 5 wherein said plastic material is flexible.

7. A mirror according to claim 4 wherein said transparent structure comprises glass.

8. A mirror according to claim 1 wherein said mirror segments comprise reflective metallization coating.

9. A mirror according to claim 1 wherein said axes of elongation are straight.

10. A mirror according to claim 1 wherein said axes of elongation are oriented substantially vertically.

11. A flying vehicle
including a segmented rear-view mirror, said vehicle comprising:
a transparent canopy interface between the interior and exterior of said flying vehicle, said transparent canopy interface defining an outer surface roughly parallel to streamlines of said vehicle;

a plurality of elongated reflective means arrayed near a surface of said canopy interface, each of said reflective means defining an axis of elongation which is, at least in part, roughly orthogonal to the normal direction of motion of said vehicle, said reflective means being oriented for reflecting light in a path between a location within said flying vehicle near the expected location of the eyes of an occupant of said vehicle and locations generally exterior and to the rear of said vehicle.

12. A vehicle according to claim 11 wherein said canopy is curved in the region with which said reflective means is associated.

13. A vehicle including a segmented rear-view mirror, said vehicle comprising:

a transparent side window interface between the interior and exterior of said vehicle, said transparent interface defining an outer surface roughly parallel to streamlines of said vehicle;

a plurality of elongated reflective means arrayed near a surface of said interface, each of said reflective means defining an axis of elongation which is, at least in part, roughly orthogonal to the normal direction of motion of said vehicle, said reflective means being oriented for reflecting light in a path between a location within said vehicle near the expected location of the eyes of an occupant of said vehicle and locations generally exterior and to the rear of said vehicle.

14. A vehicle according to claim 13 wherein said window is curved.

15. A vehicle according to claim 13 wherein said transparent side window interface is associated with a sun roof.

16. A vehicle according to claim 13 wherein said reflective means are planar, and said axes of elongation are mutually parallel.

17. A vehicle according to claim 16 wherein said planes of at least some of said reflective means are mutually parallel.

18. A vehicle according to claim 13 wherein said transparent interface comprises:

a first transparent material, and said plurality of reflective means includes generally parallel grooves formed in one surface of said first transparent material, a side of each of said grooves defining a facet, and a reflective surface applied to each said facet.

19. A vehicle according to claim 18 further comprising:

a second transparent material overlying said grooves to form a smooth surface.

20. A vehicle including a segmented rear-view mirror, said vehicle comprising:

a transparent interface between the interior and exterior of said vehicle, said transparent interface defining an outer surface roughly parallel to streamlines of said vehicle;

a plurality of elongated planar reflective means arrayed near a surface of said interface, each of said reflective means defining an axis of elongation which is, at least in part, roughly orthogonal to the normal direction of motion of said vehicle, said axes of elongation being mutually parallel, said reflective means being oriented with the planes of at least some of said reflective means mutually nonparallel, but adjacent segments almost parallel, for reflecting light in a path between a location within said vehicle near the expected location of the eyes of an occupant of said vehicle and locations generally exterior and to the rear of said vehicle.

21. A vehicle including a segmented rear-view mirror, said vehicle comprising:

a transparent interface between the interior and exterior of said vehicle, said transparent interface defining an outer surface roughly parallel to streamlines of said vehicle;

a plurality of elongated reflective means in the form of generally parallel reflective facets formed in an array in one surface of said interface, each of said reflective means defining an axis of elongation which is, at least in part, roughly orthogonal to the normal direction of motion of said vehicle, said reflective means being oriented for reflecting light in a path between a location within said vehicle near the expected location of the eyes of an occupant of said vehicle and locations generally exterior and to the rear of said vehicle.

22. A vehicle according to claim 21 wherein said reflective means comprises a metallization on a surface of at least some of said facets.

23. A vehicle according to claim 21 wherein said one surface is the interior surface of said interface.

24. A vehicle with an external rear-view mirror, comprising:

a transparent interface between the exterior and the interior of said vehicle;

an array of a plurality of elongated mirror segments, each defining an axis of elongation, said plurality of mirror segments being arrayed with said axes of elongation oriented mutually parallel and lying substantially in a plane; and mounting means for holding said array adjacent said transparent interface at a location at which it is adapted to be viewed by an occupant of said vehicle, said mounting means holding said array with said plane oriented approximately parallel to the ordinary direction of motion of said vehicle.

25. A vehicle according to claim 24 wherein said mounting means comprises a plate of transparent material, in which said mirror segments are formed.

26. A vehicle according to claim 25 wherein said plate of transparent material defines a plurality of elongated parallel grooves, each groove defining at least one flat face, and further comprising:

light-reflecting means associated with each one of said flat faces to thereby define said array.

27. A vehicle according to claim 24 wherein each of said mirror segments defines a width orthogonal to said axis of elongation, and said width is less than about 0.1 inch.

28. A vehicle with an external rear-view mirror, comprising:

a transparent interface between the exterior and the interior of said vehicle;

an array of a plurality of elongated mirror segments, each defining an axis of elongation, said plurality of mirror segments being arrayed with said axes of elongation oriented mutually parallel and lying substantially in a plane; and a plate of transparent material defining a plurality of elongated parallel grooves, each groove defining at least one flat face, and further comprising light-reflecting means associated with each one of said flat faces to thereby define said array, for holding said array adjacent said transparent interface at a location at which it is adapted to be viewed by an occupant of said vehicle, said plate holding said array with said plane oriented approximately parallel to the ordinary direction of motion of said vehicle; and wherein said grooves are filled with a transparent material so as to provide a smooth outer surface.

29. A vehicle with an external rear-view mirror, comprising:

a transparent interface between the exterior and the interior of said vehicle;

an array of a plurality of elongated mirror segments, each defining an axis of elongation, said plurality of mirror segments being arrayed with said axes of elongation oriented mutually parallel and lying substantially in a plane; and mounting means for holding said array adjacent said transparent interface at a location at which it is adapted to be viewed by an occupant of said vehicle, said mounting means holding said array with said plane oriented approximately parallel to the ordinary direction of motion of said vehicle with said plane oriented so that at least some of said mirror segments nearest the trailing edge of said array are located closer to the longitudinal axis of said vehicle than at least some of said mirror segments nearest the leading edge of said array of mirror segments.

30. A flexible rear-view mirror adapted to be affixed to a window, comprising:

a sheet of flexible, transparent plastic defining first and second broad, flat sides;

transparent adhesive coupled to said first side of said sheet;

an array of a plurality of mirror segments formed in association with said second side of said sheet, each of said mirror segments being elongated and defining an axis of elongation, said axes of elongation of said mirror segments of said array being mutually parallel, each of said mirror segments being approximately planar, with the planes of at least adjacent ones of said mirror segments of said array being approximately parallel.

31. A method for making a segmented mirror, comprising the steps of:

defining a plurality of mutually parallel elongated grooves in a surface, each of said grooves defining first and second facets, at least said first facet being flat;

metallizing at least one of said first and second facets of each of said grooves;

coating at least said first and second facets of each of said grooves with photoresist;

exposing said photoresist to radiation on one of said first and second facets of said grooves while the other of said first and second facets is shadowed to expose said photoresist in a pattern;

removing one of the exposed and non-exposed photoresist;

removing the remainder of said photoresist from one of said first and second facets of each of said grooves, thereby eliminating all said photoresist, leaving one facet metallized.

32. A method according to claim 31 further comprising the step of filling said grooves with a transparent material.

33. A method according to claim 31 wherein said exposing step includes the step of exposing said photoresist to radiation from an angle.

34. A method for making a mirror, comprising the steps of:

depositing a pattern of elongated, planar, reflective stripes on a surface of a sheet of deformable transparent material; and deforming said sheet by means of an indexed die to press said reflective stripes into said sheet so that the planes of at least adjacent ones of said stripes are substantially parallel.

* * * * *